(12) United States Patent
LeCrone et al.

(10) Patent No.: US 12,105,613 B2
(45) Date of Patent: Oct. 1, 2024

(54) PERFORMANCE SCALE TESTING WITH I/O REUSE

(71) Applicant: EMC IP Holding Company LLC, Hopkinton, MA (US)

(72) Inventors: Douglas E. LeCrone, Hopkinton, MA (US); Jeffrey L Jones, Fort Lauderdale, FL (US)

(73) Assignee: EMC IP Holding Company LLC, Hopkinton, MA (US)

( * ) Notice: Subject to any disclaimer, the term of this patent is extended or adjusted under 35 U.S.C. 154(b) by 715 days.

(21) Appl. No.: 17/234,017

(22) Filed: Apr. 19, 2021

(65) Prior Publication Data

US 2022/0334947 A1    Oct. 20, 2022

(51) Int. Cl.
*G06F 11/34* (2006.01)
*G06F 3/06* (2006.01)
*G06F 11/30* (2006.01)

(52) U.S. Cl.
CPC ........ *G06F 11/3466* (2013.01); *G06F 3/0613* (2013.01); *G06F 3/0659* (2013.01); *G06F 3/0673* (2013.01); *G06F 11/3034* (2013.01); *G06F 11/3041* (2013.01)

(58) Field of Classification Search
CPC .............................. G06F 3/0604; H04L 43/10
See application file for complete search history.

(56) References Cited

U.S. PATENT DOCUMENTS

| | | | | |
|---|---|---|---|---|
| 6,405,329 B1* | 6/2002 | Colligan | ................ | G11B 20/10 714/36 |
| 6,882,968 B1* | 4/2005 | Linden | ................ | G06F 9/45504 714/47.2 |
| 11,329,983 B2* | 5/2022 | Mondello | ............. | H04L 9/3236 |
| 2007/0283009 A1* | 12/2007 | Takemura | ............... | H04L 43/08 709/224 |
| 2016/0259578 A1* | 9/2016 | Hirai | ...................... | G06F 3/0665 |
| 2018/0062970 A1* | 3/2018 | Abzakh | ................... | H04L 43/10 |
| 2022/0057956 A1* | 2/2022 | Liang | .................... | G06F 3/0604 |

* cited by examiner

*Primary Examiner* — Getente A Yimer
(74) *Attorney, Agent, or Firm* — Muirhead and Saturnelli, LLC

(57) ABSTRACT

A host performs benchmark I/O operations for a storage system by an application on the host formulating a performance test command, providing the performance test command to a channel subsystem layer of the host that actuates communication hardware that provides signals to the storage system, and performing a plurality of benchmark I/O operations at the channel subsystem layer in response to a single performance test command by actuating the communication hardware that provides signals to the storage system. The single performance test command may result in actuating the communication hardware to read and write data at a plurality of addresses of the storage system. The channel subsystem layer may perform the plurality of benchmark I/O operations without receiving any additional data or commands from any applications on the host. A dispatch program that runs on the channel subsystem layer may receive operational data and may actuate the communication hardware.

20 Claims, 5 Drawing Sheets

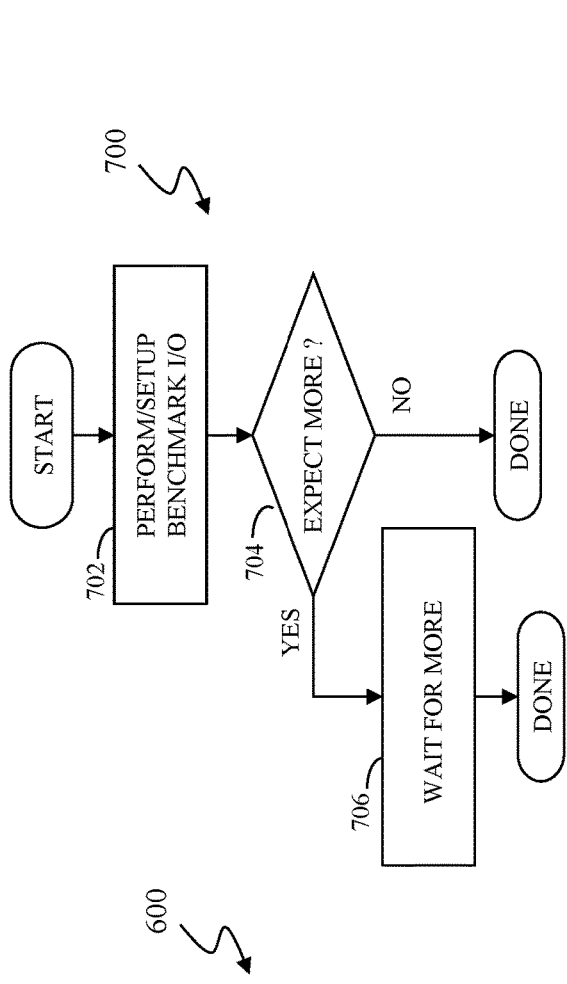
FIG. 7
FIG. 6
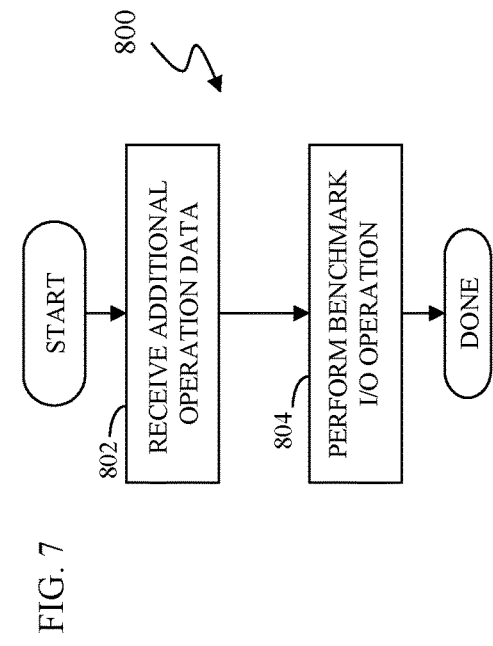
FIG. 8

PERFORMANCE SCALE TESTING WITH I/O REUSE

TECHNICAL FIELD

This application relates to the field of host computer systems and storage systems therefor and, more particularly, to the field of using host computer systems to benchmark storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

In some instances, it is desirable to measure the performance of a storage system. In such a case, one or more benchmark applications may be executed on a host system coupled to the storage system. The benchmark application(s) may do things like performing a plurality of reads and writes from and to the storage system and then measuring metrics like the amount of time it takes to perform a certain number of reads and writes.

An issue with hosts running benchmark applications is that the applications must provide reads and writes at a maximum I/O rate for the storage system being tested. If the applications cannot run at the maximum I/O rate for the storage system, then the metric that is measured is the maximum speed of the hosts and the benchmark applications, not the maximum I/O rate for the storage system. For example, if a storage system has a maximum rate of 2M I/O operations per second, but a host running benchmark I/O operations has a maximum rate of 1M I/O operations per second, then the host will incorrectly measure the I/O rate of the storage system at 1M I/O operations per second. One solution to this is to use multiple hosts to perform benchmark measurements, but this adds to the complexity and expense of benchmarking storage systems.

Accordingly, it is desirable to be able to perform benchmark measurements of storage systems without needing to use a significant number of hosts to drive the storage system to a maximum I/O rate needed for accurate benchmark measurements.

SUMMARY OF THE INVENTION

According to the system described herein, a host performs benchmark I/O operations for a storage system by an application on the host formulating a performance test command, providing the performance test command to a channel subsystem layer of the host that actuates communication hardware that provides signals to the storage system, and performing a plurality of benchmark I/O operations at the channel subsystem layer in response to a single performance test command by actuating the communication hardware that provides signals to the storage system. The single performance test command may result in actuating the communication hardware to read and write data at a plurality of addresses of the storage system. The channel subsystem layer may perform the plurality of benchmark I/O operations without receiving any additional data or commands from any applications on the host. A dispatch program that runs on the channel subsystem layer may receive operational data corresponding to the performance test command from an SSCH layer of the host. The dispatch program may actuate the communication hardware that provides signals to the storage system. The dispatch program may wait for additional data and/or commands provided by the application through the SSCH layer prior to actuating the communication hardware. The additional data and/or commands may include parameters used in connection with the plurality of benchmark I/O operations. Functionality for the dispatch software may be provided by a self-modifying channel program at the channel subsystem layer. The host may run z/os operating system software. The host may simulate operation of the channel subsystem layer.

According further to the system described herein, a non-transitory computer readable medium contains software for a host to perform benchmark I/O operations for a storage system. The software includes executable code that formulates a performance test command for an application running on the host, executable code that provides the performance test command to a channel subsystem layer of the host that actuates communication hardware that provides signals to the storage system, and executable code that performs a plurality of benchmark I/O operations at the channel subsystem layer in response to a single performance test command by actuating the communication hardware that provides signals to the storage system. The single performance test command may result in actuating the communication hardware to read and write data at a plurality of addresses of the storage system. The channel subsystem layer may perform the plurality of benchmark I/O operations without receiving any additional data or commands from any applications on the host. A dispatch program that runs on the channel subsystem layer may receive operational data corresponding to the performance test command from an SSCH layer of the host. The dispatch program may actuate the communication hardware that provides signals to the storage system. The dispatch program may wait for additional data and/or commands provided by the application through the SSCH layer prior to actuating the communication hardware. The additional data and/or commands may include parameters used in connection with the plurality of benchmark I/O operations. Functionality for the dispatch software may be provided by a self-modifying channel program at the channel subsystem layer. The host may run z/os operating system software. The host may simulate operation of the channel subsystem layer.

BRIEF DESCRIPTION OF THE DRAWINGS

Embodiments of the system are described with reference to the several figures of the drawings, noted as follows.

FIG. 6 is a flow diagram illustrating processing performed in connection with a dispatch program at the channel subsystem layer that performs benchmark I/O operations according to an embodiment of the system described herein.

FIG. 7 is a flow diagram illustrating processing performed in connection with a dispatch program actuating communication hardware used for transferring data between a host and a storage system according to an embodiment of the system described herein.

FIG. 8 is. a flow diagram illustrating processing performed in connection with a dispatch program waiting for additional input according to an embodiment of the system described herein.

DETAILED DESCRIPTION OF VARIOUS EMBODIMENTS

The system described herein provides a mechanism for a host to efficiently perform benchmark I/O operations by using a dispatch program at a channel subsystem layer to generate a plurality of benchmark I/O operations based on a single performance test command from an application on the host.

Figure 1:
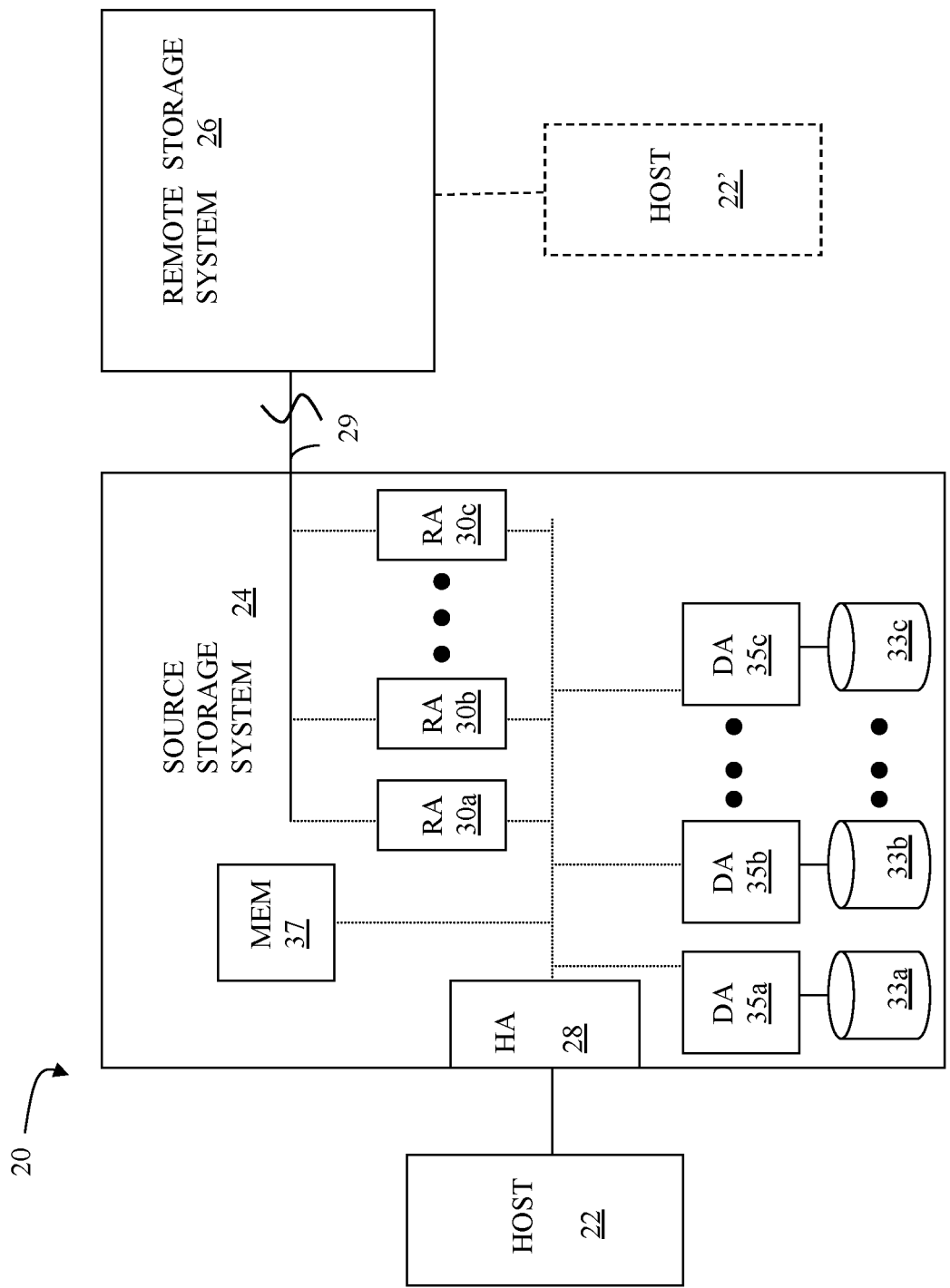
FIG. 1 is a schematic illustration showing a relationship between hosts and storage systems according to an embodiment of the system described herein.

FIG. 1 is a diagram 20 showing a relationship between a host 22 and a source storage system 24 that may be used in connection with an embodiment of the system described herein. In an embodiment, the source storage system 24 may be a PowerMax, Symmetrix, or VMAX storage system produced by Dell EMC of Hopkinton, Massachusetts; however, the system described herein may operate with other appropriate types of storage systems. Also illustrated is another (remote) storage system 26 that may be similar to, or different from, the source storage system 24 and may, in various embodiments, be coupled to the source storage system 24, using, for example, a network. The host 22 reads and writes data from and to the source storage system 24 via an HA 28 (host adapter), which facilitates an interface between the host 22 and the source storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the source storage system 24 may be copied to the remote storage system 26 via a link 29. For example, transferring data may be part of a data mirroring or replication process that causes data on the remote storage system 26 to be identical to the data on the remote storage system 24. Although only the one link 29 is shown, it is possible to have additional links between the storage systems 24, 26 and to have links between one or both of the storage systems 24, 26 and other storage systems (not shown). The source storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The source storage system 24 may include one or more physical storage units (including disks, solid state storage devices, etc.), each containing a different portion of data stored on the source storage system 24. FIG. 1 shows the source storage system 24 having a plurality of physical storage units 33a-33c. The source storage system 24 (and/or remote storage system 26) may be provided as a stand-alone device coupled to the host 22 as shown in FIG. 1 or, alternatively, the source storage system 24 (and/or remote storage system 26) may be part of a storage area network (SAN) that includes a plurality of other storage systems as well as routers, network connections, etc. (not shown in FIG. 1). The storage systems 24, 26 may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the source storage system 24. Note that, in other embodiments, it is possible for more than one physical storage unit to be serviced by a DA and that it is possible for more than one DA to service a physical storage unit. The source storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the source storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the source storage system 24, operation may resume at a remote site containing the remote storage system 26 and the other host 22'. In some cases, the host 22 may be directly coupled to the remote storage system 26, thus protecting from failure of the source storage system 24 without necessarily protecting from failure of the host 22.

Figure 2:
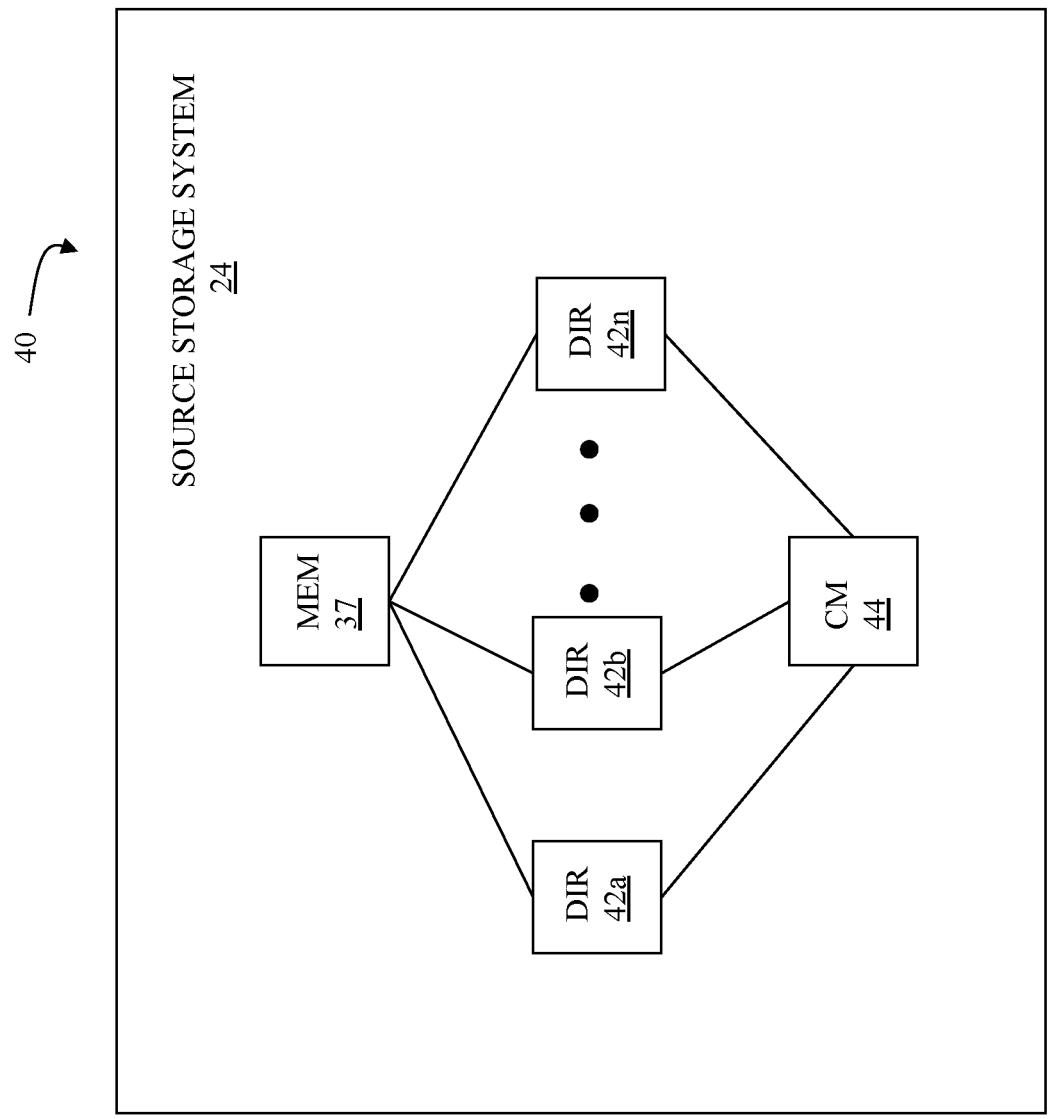
FIG. 2 is a schematic diagram illustrating a storage system where each of a plurality of directors are coupled to a memory according to an embodiment of the system described herein.

FIG. 2 is a schematic diagram 40 illustrating an embodiment of the source storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the source storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
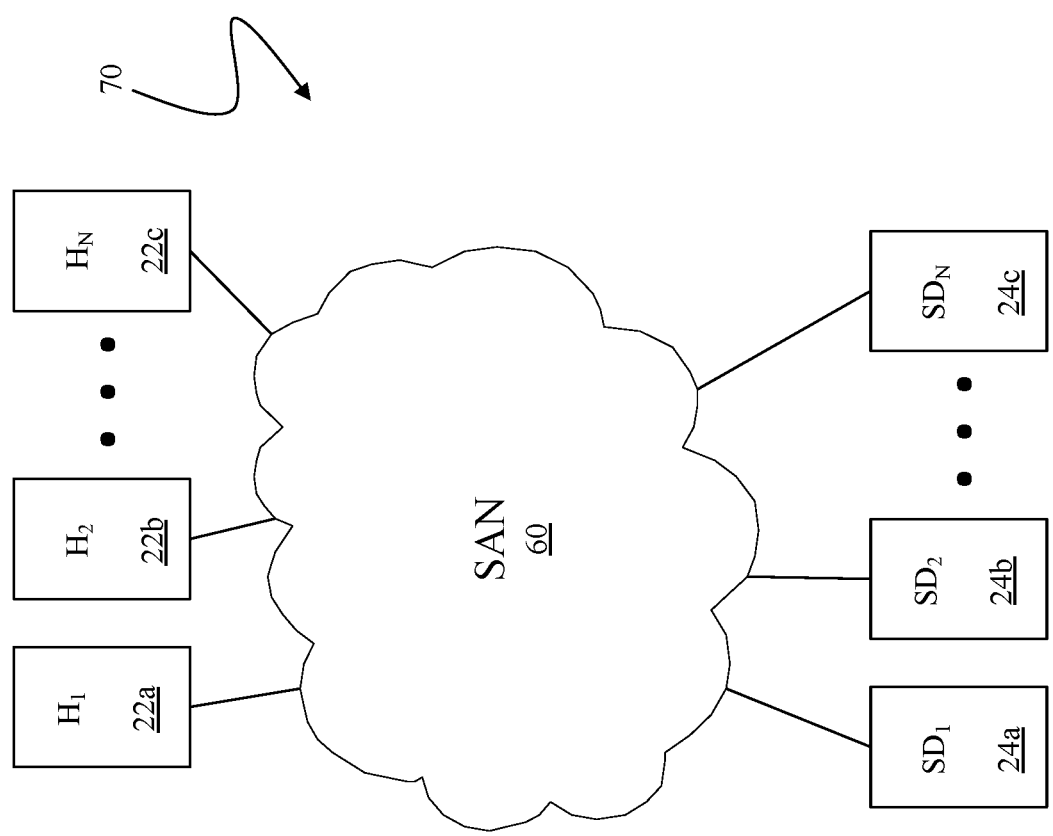
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
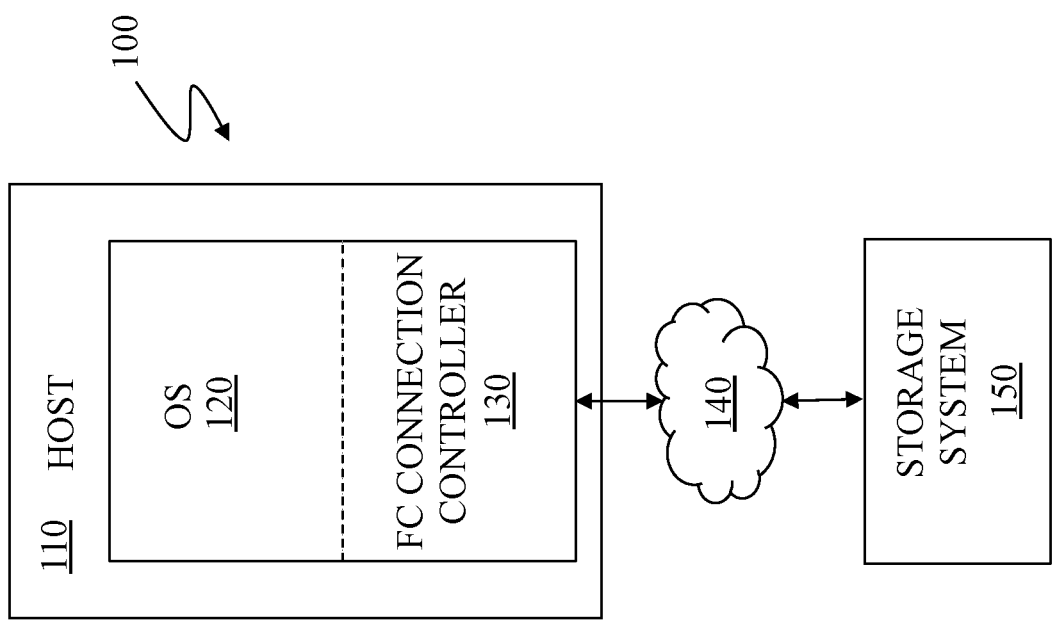
FIG. 4 is a schematic illustration showing a host system and a storage system according to an embodiment of the system described herein.

FIG. 4 is a diagram 100 showing a controller 130 for providing a communication connection between a host 110 and a storage system 150 according to an embodiment of the system described herein. The host 110 is similar to the hosts 22, 22', discussed above and the storage system 150 is similar to the storage systems 24, 26, discussed above. In an embodiment, the host 110 may be a computer running Linux, Windows, Mac OS, z/OS or some other appropriate operating system 120. The I/O processing on the host 110 may cooperate with a Fibre Channel controller 130 to enable I/O operations with the storage system 150. The controller 130 may send and receive data to and from the storage system 150 using a remote connection mechanism 140, that may include a network (such as the Internet, and appropriate connection thereof). The storage system 150 may include physical storage volumes and/or logical volumes, such as Dell EMC Corporation's VMAX or Symmetrix data storage facility. The controller 130 may act as an I/O subsystem providing appropriate communication capability, such as ANSI FC-SB-3 Single-Byte Command Code Sets-3 Mapping Protocol for Fibre Channel. The storage system 150 may include features and/or components enabling communication with the host 110. For a discussion of features and implementations of storage system communications and suitable Fibre channel protocols operating therewith on z/Architecture computing systems, see J. Entwistle, "IBM System z10 FICON Express8 FCP Channel Performance Report," Technical paper, August 2009, 27 pp., which is incorporated herein by reference.

It is noted that various components of the system illustrated by the diagram 100 may be emulated. For further discussion of emulation of I/O computing components, see U.S. Pat. No. 9,665,502 to Jones et al., issued on May 30, 2017 and entitled "Virtual I/O Hardware" and U.S. Pat. No. 9,170,904 to LeCrone et al., issued on Oct. 27, 2015 and entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 140 may provide Fibre Channne connectivity or may include an Internet connection and/or possibly some other types of connection(s). In an embodiment herein, the connection mechanism 140 may be directly incompatible with a Fibre Channel connection and/or conventional protocols used thereon. The incompatibility may be hardware incompatibility, software incompatibility, or both. Such connection mechanism 140 may not support a direct Fibre Channel connection but, instead, rely on a an appropriate emulator for providing data in an appropriate format. It is further noted that where a Fibre Channel protocol emulation is being performed, the storage device 150 may include or be coupled to a corresponding Fibre Channel protocol emulator portion that may send and receive data to and from the connection mechanism 140 and also emulates, for example, a Fibre Channel FCO physical layer for the benefit of the storage device 150. Thus, in cases involving emulation, both the host 110 and the storage device 150 may operate as if the devices 110, 150 were communicating using a Fibre Channel hardware connection. In other embodiments, the connection mechanism 140 may be directly compatible with Fibre Channel communication and may be implemented using, for example, a Fibre Channel cable and/or a connection mechanism such as the SAN 60, discussed above.

Figure 5:
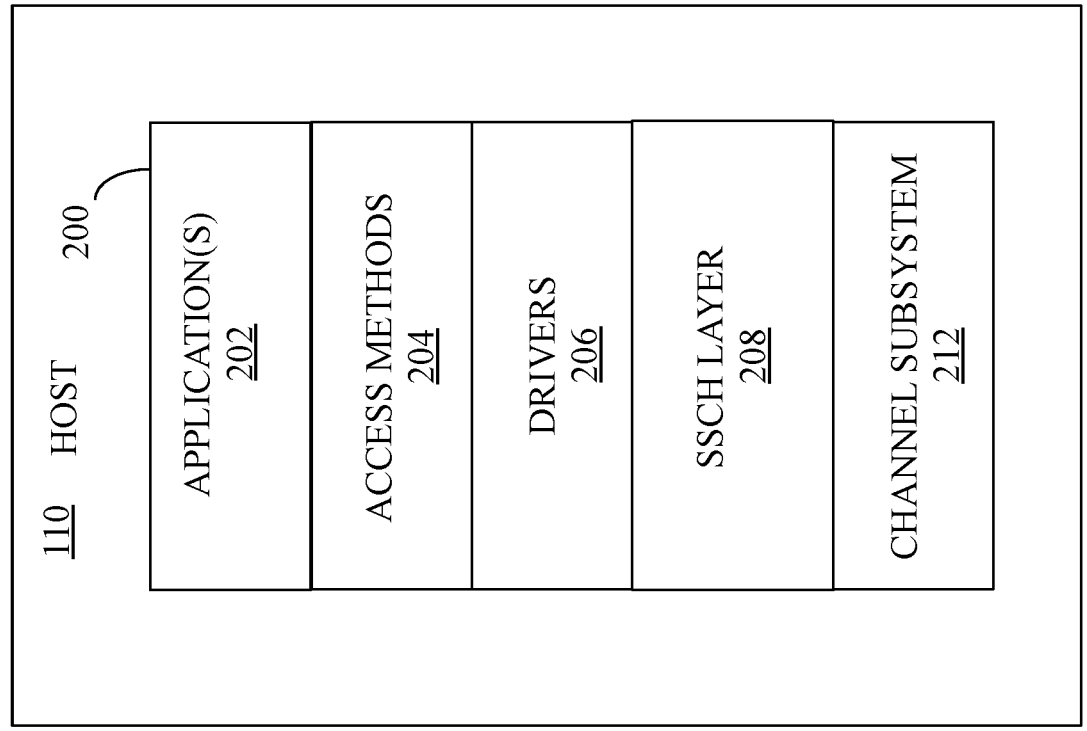
FIG. 5 is a schematic illustration showing software layers in a host system according to an embodiment of the system described herein.

Referring to FIG. 5, the host 110 is illustrated with software 200 having an application(s) layer 202, an access methods layer 204, a drivers layer 206, an SSCH layer 208, and a channel subsystem layer 212. The application(s) layer 202 includes one or more software applications that run on the host 110. The access methods layer 204 includes I/O routines (e.g., read, write, open, etc.) that are used by applications in the application(s) layer 202 in connection with performing I/O operations. Software in the application(s) layer 202 calls specific routines in the access methods layer 204 to access data on a storage device coupled to the host.

The I/O routines in the access methods layer 204 call driver routines in the drivers layer 206 that perform lower-level device specific operations that depend upon the specific type of I/O device and the type of connection thereto. For example, a first driver for a Symmetrix storage device coupled to the host 110 by a FICON connection may be different than a second driver used for a different type of non-volatile storage device coupled to the host 110 using a different type of connection. Note, however, that an application in the application layer 202 may call the same routine (e.g., read) in the access layer 204 irrespective of the physical hardware (and connection there) used for the data, but that the routine in the access layer 204 that is called may call different routines in the SSCH layer 208, depending upon a specific configuration/hardware of the system.

The SSCH layer 208 includes routines that perform low-level operations that make calls to the channel subsystem layer 212 to directly control the hardware used for I/O operations, including any storage devices and channels used from transferring data between the host 110 and the storage devices. Routines in the drivers layer 206 call routines in the SSCH layer 208 to perform hardware operations and to transfer data to and from the host 110 and to exchange status and control information to facilitate control of the I/O hardware.

It is possible to modify the drivers layer 206 and/or the SCCH layer 208 to allow communication by the host 22 (e.g., communication between the host 22 and the storage system 24) to use a protocol other than FICON. For example, the drivers layer 206 and/or the SCCH layer 208 may be modified to provide TCP/IP communications between the host 22 and the storage system 24. Applications in the applications layer 202 do not need to be modified and may continue to make the same calls to the access methods layer 204 (e.g., read, write, etc.) irrespective of whether the driver layer 206 ultimately directs I/O operations to be performed using a protocol other than FICON. Thus, applications on the host 22 exchange data between the host 22 and the storage system 24 independently from any connection protocol. Note that, in some cases, such as cases involving closed systems, it may be desirable to make modifications at the SCCH layer 208 in order to adapt the host 22 to use a different communication protocol. In other instances, it may be more advantageous to make modifications at the drivers layer 206. Generally, the system described herein provides an alternative communication mechanism for systems, such as the host 22, that are otherwise configured to communicate using FICON protocols.

Referring to FIG. 6, a flow diagram 600 illustrates processing performed in connection with a dispatch program at the channel subsystem layer 212 that performs benchmark I/O operations. The dispatch program receives I/O operations and I/O related operations (e.g., a status inquiry) from the SSCH layer 208, discussed above, and provides corresponding signals to actuate the communication hardware used for transferring data between the host 110 and the storage system 150 (shown in FIG. 4). The specific format of the data being processed by the dispatch program depends on the particular communication protocol being used and, in some cases, on the specific hardware being used to connect the host 110 with the storage system 150.

Processing begins at a first step 602 where the dispatch program receives I/O operation data from the SSCH layer 208. The I/O operation data originates with an application running on the host (discussed above) either providing a conventional I/O operation or formulating a performance test command (for benchmark I/O operations) that transitions through the access methods layer 204, the drivers layer 206 and the SSCH layer 208. Following the step 602 is a test step 604 where it is determined if the I/O operation data received at the step 602 corresponds to a conventional I/O operation or is for a benchmark I/O operation, and thus should be handled differently. If it is determined at the test step 604 that the operation data from the SSCH layer 208 corresponds to a conventional I/O operation, then control transfers from the step 604 to a step 606 where a conventional I/O operation is performed. Following the step 606, processing is complete.

If it is determined at the test step 604 that the I/O operation data from the SSCH layer 208 corresponds to a benchmark I/O operation, then control transfers from the test step 604 to a step 608 where the dispatch program causes benchmark I/O operations to be performed. The processing provided at the step 608 is described in more detail elsewhere herein, but generally involves performing a plurality of I/O operations to test/benchmark one or more storage systems coupled to the host 110 in response to a relatively small number of times the dispatch program is actuated. Thus, for example, the dispatch program may receive operational data from the SSCH layer 208 one time (a single performance test command) but, from that, may generate thousands of benchmark I/O operations that test the performance of the one or more storage systems coupled to the host 110 (e.g., the storage system 150). The additional benchmark I/O operations may be performed without receiving any additional data or commands from any application on the host 110. This is described in more detail elsewhere herein. Following the step 608, processing is complete.

Referring to FIG. 7, a flow diagram 700 illustrates in more detail processing performed at the step 608 of the flow diagram 600, discussed above, where the dispatch program actuates the communication hardware used for transferring data between the host 110 and the storage system 150. Of course, details of the specific hardware actuation depend upon a number of factors, such as the specific communication hardware that is used, the communication protocol, etc.

Generally, actuating specific communication hardware is well known, because that is how conventional I/O operations are performed.

Processing for the flow diagram 700 begins at a step 702 where the dispatch program performs and/or sets up specific benchmark I/O operations indicated by the operational data received by the dispatch program from the SSCH layer 208. The processing at the step 702 may include the dispatch program at the channel subsystem layer 212 accepting an application I/O corresponding to a performance test command (operational data from the SSCH layer 208) and converting the application I/O to a format (e.g., conventional IUs) that may be sent to the storage system 150 to perform benchmark tests. The dispatch program at the channel subsystem layer 212 may repeat the application I/O or modify the application I/O in a predetermined manner (e.g., changing addresses incrementally) and repeat the application I/O at a predetermined rate, without any application at the host 110 needing to issue any additional I/Os. In some embodiments, this functionality may be provided using a self-modifying channel program, such as when the host is running z/os operating system software. In the case of a simulation, the simulation may be modified to provide this functionality. The dispatch program at the channel subsystem layer 212 may continue issuing a same I/O or modify I/Os in a way to produce a desired pattern and I/O rate. The pattern may be previously described or passed to the dispatch program from an application, which may also provide repeat counts and other parameters for the dispatch program at the channel subsystem layer 212 to issue a plurality of I/Os to the storage system 150. Other possibilities include having a set of predefined IU's or a model of predefined IU's and having a host benchmark application providing an indication to the dispatch program at the channel subsystem layer to initiate a predefined I/O pattern that includes the IU's. In some embodiments, a host benchmark application may provide set up information, where the dispatch program at the channel subsystem layer 212 uses predefined data IU's so that only a minimal amount of information would need to be transferred from the host application to the dispatch program to perform benchmark I/Os. Note that, in many benchmark scenarios, specific values of data are not important and may be predefined. In embodiments where compressibility of data needs to be considered, it is possible to have multiple data models.

Following the step 702 is a test step 704 where it is determined if the operational data provided to the dispatch program indicates that more data and/or control information is to be expected. As discussed elsewhere herein, in some cases, the dispatch program may receive information from a host benchmark application to set up subsequent benchmark I/O operations, but may wait for further information from a host benchmark application (e.g., wait for an address range, an indication of the number of I/Os to perform, etc.). It is also possible for the operational data provided at the step 702 to be used for only setting up benchmark I/Os and the system waits for additional operational data to actuate the benchmark I/Os. If it is determined at the step 704 that there is no more data to be provided in connection with the benchmark operation, then processing is complete. Otherwise, control transfers from the test step 704 to a step 706 where the dispatch programs waits for additional data.

Referring to FIG. 8, a flow diagram 800 illustrates in more detail processing performed at the step 706, discussed above, where the dispatch program waits for additional input. As discussed elsewhere herein, the additional input may provide more parameters for benchmark I/O operations or may actuate benchmark I/O operations that have been set up with previous operational data, or some combination thereof. Processing begins at a first step 802 where the dispatch program receives additional operational data that originated with a call by an application program, as described elsewhere herein. Following the step 802 is a step 804 where the dispatch program performs appropriate benchmark I/O operations as a result of receiving the additional operational data at the step 802. Following the step 804, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for a host to perform benchmark IO operations and conventional IO operations for a storage system, comprising:
   an application on the host formulating IO data corresponding to one of: a performance test command or a conventional IO operation;
   providing the IO data to a channel subsystem layer of the host that actuates communication hardware that provides signals to the storage system;
   the channel subsystem determining if the IO data corresponds to a performance test command or to a conventional IO operation;
   the channel subsystem actuating the communication hardware to transfer at least some of the IO data from the host for storage on the storage system in response to the IO data corresponding to a conventional IO operation; and
   the channel subsystem performing a plurality of benchmark IO operations at the channel subsystem layer by repeatedly actuating the communication hardware to make multiple transfers of data from the host to the storage system in response to the IO data corresponding to a single performance test command sent by the application to the channel subsystem layer.

2. The method, according to claim 1, wherein the single performance test command results in actuating the communication hardware to read and write data at a plurality of addresses of the storage system.

3. The method, according to claim 1, wherein the channel subsystem layer performs the plurality of benchmark IO operations without receiving any additional data or commands from any applications on the host.

4. The method, according to claim 1, wherein a dispatch program that runs on the channel subsystem layer actuates the communication hardware that provides signals to the storage system.

5. The method, according to claim 4, wherein the dispatch program waits for additional data or commands provided by the application prior to actuating the communication hardware.

6. The method, according to claim 5, wherein the additional data or commands includes parameters used in connection with the plurality of benchmark IO operations.

7. The method, according to claim 4, wherein functionality for the dispatch program is provided by a self-modifying channel program at the channel subsystem layer.

8. The method, according to claim 1, wherein the host simulates operation of the channel subsystem layer.

9. A non-transitory computer readable medium containing software for a host to perform benchmark IO operations and conventional IO operations for a storage system, the software comprising:
   executable code that formulates IO data corresponding to one of: a performance test command or a conventional IO operation;
   executable code that provides the IO data to a channel subsystem layer of the host that actuates communication hardware that provides signals to the storage system;
   executable code at the channel subsystem that determines if the IO data corresponds to a performance test command or to a conventional IO operation;
   executable code at the channel subsystem that actuates the communication hardware to transfer at least some of the IO data from the host for storage on the storage system in response to the IO data corresponding to a conventional IO operation; and
   executable code at the channel subsystem that performs a plurality of benchmark IO operations at the channel subsystem layer by repeatedly actuating the communication hardware to make multiple transfers of data from the host to the storage system in response to the IO data corresponding to a single performance test command sent by the application to the channel subsystem layer.

10. The non-transitory computer readable medium, according to claim 9, wherein the single performance test command results in actuating the communication hardware to read and write data at a plurality of addresses of the storage system.

11. The non-transitory computer readable medium, according to claim 9, wherein the channel subsystem layer performs the plurality of benchmark IO operations without receiving any additional data or commands from any applications on the host.

12. The non-transitory computer readable medium, according to claim 9, wherein a dispatch program that runs on the channel subsystem layer actuates the communication hardware that provides signals to the storage system.

13. The non-transitory computer readable medium, according to claim 12, wherein the dispatch program waits for additional data or commands provided by the application prior to actuating the communication hardware.

14. The non-transitory computer readable medium, according to claim 13, wherein the additional data or commands includes parameters used in connection with the plurality of benchmark IO operations.

15. The non-transitory computer readable medium, according to claim 12, wherein functionality for the dispatch program is provided by a self-modifying channel program at the channel subsystem layer.

16. The non-transitory computer readable medium, according to claim 9, wherein the host simulates operation of the channel subsystem layer.

17. A system that performs benchmark IO operations and conventional IO operations, comprising:
   a storage system; and
   a host coupled to the storage system having a processor and a non-transitory computer readable medium coupled to the processor containing software that, when executed, performs benchmark IO operations and conventional IO operations in response to an application on the host formulating IO data corresponding to one of: a performance test command or a conventional IO operation by providing the IO data to a channel subsystem layer of the host that actuates communication hardware that provides signals to the storage system, the channel subsystem determining if the IO data corresponds to a performance test command or to a conventional IO operation, the channel subsystem actuating the communication hardware to transfer at least some of the IO data from the host for storage on the storage system in response to the IO data corresponding to a conventional IO operation, and the channel subsystem performing a plurality of benchmark IO operations at the channel subsystem layer by repeatedly actuating the communication hardware to make multiple transfers of data from the host to the storage system in response to the IO data corresponding to a single performance test command sent by the application to the channel subsystem layer.

18. The system, according to claim 17, wherein the channel subsystem layer performs the plurality of benchmark IO operations without receiving any additional data or commands from any applications on the host.

19. The system, according to claim 17, wherein a dispatch program that runs on the channel subsystem layer actuates the communication hardware that provides signals to the storage system.

20. The method, according to claim 19, wherein the dispatch program waits for additional data or commands provided by the application prior to actuating the communication hardware.

* * * * *